UNITED STATES PATENT OFFICE.

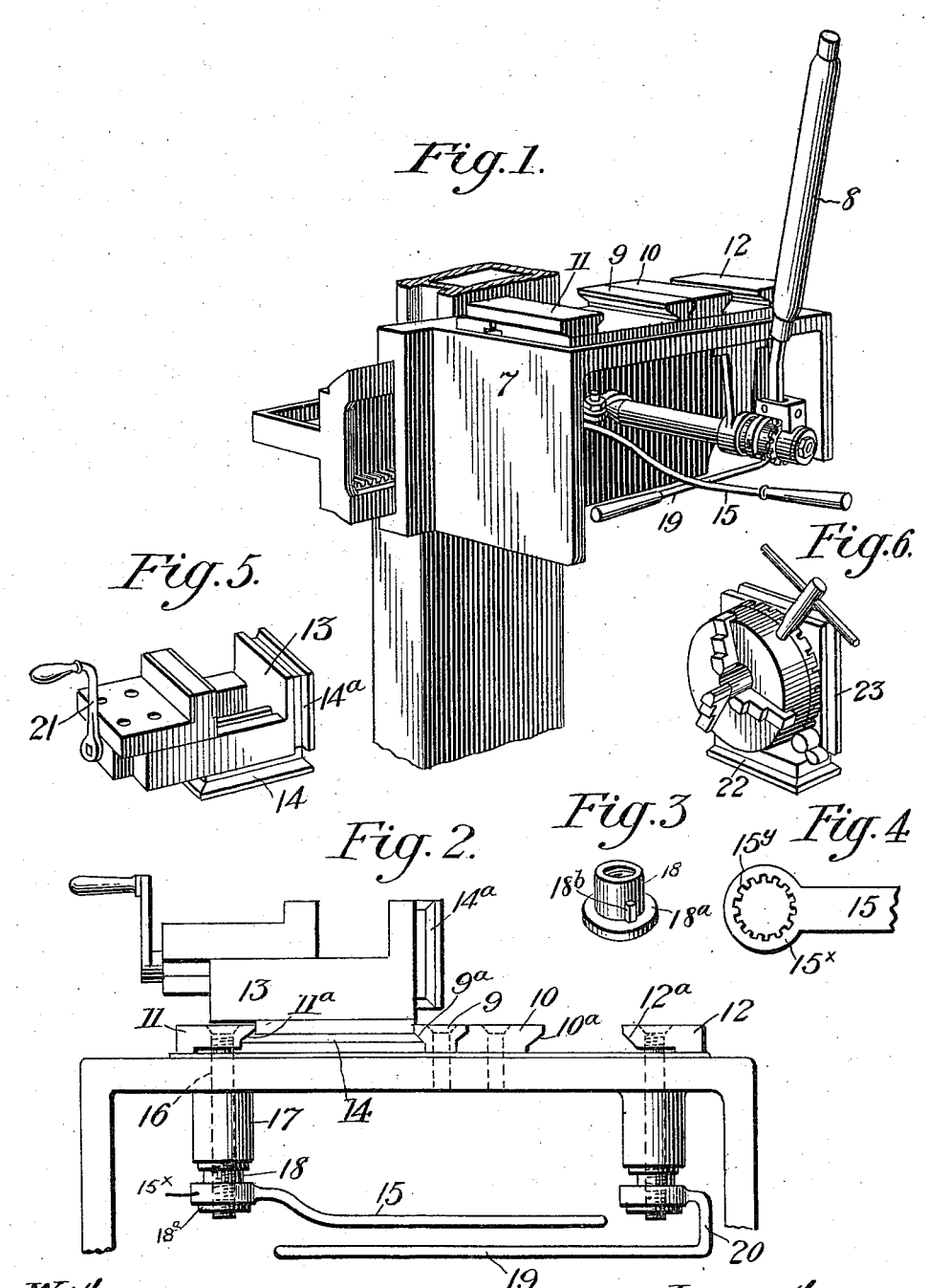

FAY O. FARWELL, OF DUBUQUE, IOWA, ASSIGNOR OF ONE-HALF TO THE ADAMS COMPANY, OF DUBUQUE, IOWA, A CORPORATION OF IOWA.

WORK-HOLDING MECHANISM FOR METAL-WORKING MACHINES.

965,575.      Specification of Letters Patent.      Patented July 26, 1910.

Original application filed December 9, 1908, Serial No. 466,716. Divided and this application filed July 19, 1909. Serial No. 508,361.

*To all whom it may concern:*

Be it known that I, FAY O. FARWELL, a citizen of the United States, residing at Dubuque, county of Dubuque, and State of Iowa, have invented certain new and useful Improvements in Work-Holding Mechanism for Metal-Working Machines; and I do hereby declare the following to be a full, clear, and exact description of the invention, such as will enable others skilled in the art to which it appertains to make and use the same.

This invention relates to work holding mechanism for metal working machines, such as milling machines, shapers, and planers. Said mechanism was devised primarily for use in a milling machine of the type described in my application, Serial No. 466,716, filed December 9, 1908, of which this application is a division, but the novel features of the construction are capable of wide application and may be used in any machine where a work holder is to be clamped upon a bed, table, or similar support.

The primary object of this invention is to provide a clamping device which can be operated from the under portion of the bed or table and is arranged in a convenient and compact manner so as to be out of the way of the workman when the machine is in operation, the clamping action on the work holder and the release of the latter being effected with great readiness and rapidity by means such as an operating lever that can be swung under the table or bed when not in use.

The invention also aims to provide an improved connection between the operating lever and the clamping mechanism by which the former may be operated in a small space, but to such an extent as to cause the requisite clamping action on the work holder, this connection being of such a nature that the lever is readily detachable and that the other members of the mechanism may be easily dismounted when desired.

It is also an object of the invention to provide a work holding table with two or more clamping devices, the operating levers of which are moved oppositely, so that the levers may extend toward and parallel with each other beneath the table for convenient access by the operator, as will appear from the following description.

In the accompanying drawing, Figure 1 is a perspective view of a work holding mechanism constructed in accordance with the invention, Fig. 2 is a front elevation of the work supporting table showing one of the work holders clamped thereon. Figs. 3 and 4 are detail views of the clamping mechanism, and Figs. 5 and 6 are perspective views showing work holders of different types adapted for use with the improved mechanism.

In the drawing, the clamping mechanism is illustrated as used in connection with the sliding table 7 of a milling machine, which table can be adjusted horizontally by means of lever mechanism 8, but it will be understood from what has been said above that the invention is not limited to use in a milling machine. The table 7 has clamped to the top thereof, at its intermediate portion, fixed locking strips or blocks 9 and 10 which extend transversely of the table and are provided at their sides with undercut edges $9^a$ and $10^a$. Near the ends of the table are located movable clamping strips or blocks 11, 12, which are also provided with undercut edges $11^a$, $12^a$ located opposite the undercut edges $9^a$ and $10^a$, respectively. In the embodiment shown, a work holder may be clamped on the table either between the fixed strip 9 and the movable strip 11, or between the fixed strip 10 and the movable strip 12, such clamping being effected by vertical movement of the strip 11 or 12 as the case may be.

In Fig. 2, I have shown a work holder 13 clamped on the table between the fixed strip 9 and the movable strip 11, and as the operation of the two clamping devices shown, is substantially the same, it will suffice to describe only one of them in detail. The work holder 13, which is shown in detail in Fig. 5, has a square base 14, the edges of which project laterally and are beveled to fit in either one of the ways formed between the overhanging or undercut edges of the clamping blocks and extending transversely of the table. Said work holder may be placed in either slide-way and faced in any of four directions, and when it is placed, for example, in the position shown in Fig. 2, it can be tightly clamped in position on the table by operating a lever 15 which pulls the movable clamping strip or block 11 in downward direction so that the work holder is firmly clamped and wedged in the slide-way. The downward movement of the block or strip 11 by means of the lever 15 in order to clamp the work holder is effected by the following mechanism: Screwed into the strip 11 at a point adjacent its overhanging undercut edge is a bolt 16 which extends down through the table and through a boss or sleeve 17 cast integral with the table at the under portion of the latter. Said boss or sleeve forms a bearing of some length for the bolt 16 and its lower end serves as a seat for a nut 18 that is threaded on the lower end of the bolt and is manipulated by means of the lever 15. By rotating the nut by means of said lever the bolt 16 may be moved downward without rotating, thereby forcing downward the clamping block 11 on the work holder, the boss or sleeve 17 forming an abutment against which the nut 18 bears during its rotation.

The nut 18 is preferably of cylindrical form, as shown in Fig. 3, and provided at its lower part with a retaining flange 18$^a$, there being a lug 18$^b$ formed exteriorly on the side wall of the nut immediately above said flange. The end of the lever 15 which engages said nut is in the form of a socket 15$^x$ adapted to fit over the upper cylindrical portion of the nut and to be supported on the flange 18$^a$ of the latter; and said socket is provided at its interior with a circumferential series of notches 15$^y$ adapted to be engaged by the lug 18$^b$ when the nut is to be screwed on the bolt in either direction. In assembling the parts, the socket 15$^x$ of the lever is placed over the upper portion of the nut, after which the nut is screwed on the lower portion of the bolt 16, and when this is effected, the lever 15 will be effectively supported by the flange 18$^a$ of the nut. The lever is thereby maintained in such a position as to be rapidly grasped and operated, the lug of the nut being engaged in one of the notches of the lever socket. Different notches may be engaged with said lug in order to afford an oscillating movement of the lever within a limited space, by reason of the fact that the lever may be raised with respect to the nut in such a manner that the lug 18$^b$ will be disengaged, whereupon the lever may be shifted without operating the nut, as will be readily understood. Thus the lever may be placed in a predetermined position with respect to the table (such as one in which said lever extends longitudinally beneath the latter) regardless of the angular position of the nut on its bolt.

The clamping mechanism which is shown at the right of the table in Fig. 2 is substantially the same as that just described, with the exception that the bolt and nut have a left hand thread instead of a right hand thread, so that when the levers are forced into clamping position they will be located in parallelism beneath the table, as shown in Fig. 2, in order that either one of the levers may be conveniently grasped. The lever used to operate the clamping block 12 is denoted by reference character 19 and it is provided near the socket end thereof with a bend 20 in order that the handle portion of the lever may extend beneath and parallel to the lever 15, as above indicated.

The work holder 13 illustrated in Fig. 5 is not only provided with a base 14, by which it may be clamped on the table, but it is also provided at one end with a second square base 14$^a$, so that the work holder may be stood on end, if such is desired and clamped in this position. Said work holder is in the form of a vise, the movable jaw of which is operated by a hand crank 21. The work holder shown in Fig. 6 is a species of chuck, and said chuck is provided with beveled clamping bases 22, 23 extending parallel and at right angles respectively to the axis of the chuck. By means of these bases the chuck may be clamped on the table with its axis arranged either horizontally or vertically, as called for by the nature and character of the work.

After the work holder is slid into one of the slide-ways, the movable clamping block or strip being raised to a slight extent, the work holder is firmly clamped in position by forcing the clamping block in downward direction through the bolt and lever connection described, the overhanging edge of the clamping block being pressed against the base of the work holder with a considerable amount of friction, whereby the work holder is tightly locked in position. The release of the work holder may be effected by a relatively slight movement of the operating lever, which movement releases the clamping block and permits the work holder to be moved to another position in the slide-way or taken off of the table. The clamping of the work holder in the desired position and the release of the same may therefore be effected with great quickness and facility.

Without limiting myself to the precise construction shown, I claim:—

1. The combination of a work supporting table, a straight vertically movable clamping strip or block on said table having an undercut edge to overhang the work holder, a fixed clamping strip on the table parallel to said first named strip and also having an undercut edge to overhang the work holder, said strips forming in conjunction a straight guide into which the work holder may be introduced at one end, and means for raising and lowering the movable clamping strip.

2. The combination of a work supporting table, a straight vertically movable clamping strip on said table having an undercut edge to overhang the work holder, a fixed clamping strip on the table parallel to said movable strip and coacting therewith, said strips forming in conjunction a straight guide open at both ends, and means for raising and lowering the movable clamping strip.

3. The combination of a work supporting table, a vertically movable transverse clamping strip or block on said table and having an under-cut edge to overhang the work holder, a fixed clamping strip on the table parallel to said first named strip and also having an under-cut edge to overhang the work holder, said strips forming in conjunction a straight guide into which the work holder may be introduced at either end, and means for raising and lowering the movable clamping strip.

4. The combination with a work-holding table, of a work-clamping device having an operating bolt extending downward through the table, a nut threaded on said bolt beneath the table and having a laterally extending flange, and a lever for operating the nut, embracing the latter and supported on the flange thereof.

5. The combination with a work-holding table, of a work-clamping device having an operating bolt extending downward through the table, a nut threaded on said bolt beneath the table and having a lateral flange and a lug above said flange, and an operating lever provided with a socket loosely embracing said nut and supported on said flange, said socket having a plurality of notches adapted to engage said lug, and the lever being freely movable with respect to the latter, whereby said lever may be placed in a predetermined position with respect to the table regardless of the angular position of the nut on its bolt.

6. In clamping mechanism such as described, the combination of a work supporting table, clamping devices located side by side on said table and each embodying a bolt extending downward through the table, a nut on the lower end of each bolt, and operating levers for said nuts movable horizontally beneath the table, one above the other, the levers being moved toward each other to effect the tightening of the nuts, whereby they will lie in close proximity to each other when said nuts are tightened.

In testimony whereof I affix my signature, in presence of two witnesses.

FAY O. FARWELL.

Witnesses:
HERBERT ADAMS,
GLENN MUFFLY.